(12) United States Patent
Kwon et al.

(10) Patent No.: US 12,139,000 B2
(45) Date of Patent: Nov. 12, 2024

(54) POWERTRAIN FOR ELECTRIC VEHICLE

(71) Applicants: Hyundai Motor Company, Seoul (KR); Kia Corporation, Seoul (KR)

(72) Inventors: Hyuk Joon Kwon, Suwon-Si (KR); Buhm Joo Suh, Hwaseong-Si (KR); Woul Sun Choi, Hwaseong-Si (KR); Seung Wook Lee, Gwangmyeong-Si (KR); Tal Chol Kim, Bucheon-Si (KR); Yeong Il Choi, Anyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 85 days.

(21) Appl. No.: 18/116,746

(22) Filed: Mar. 2, 2023

(65) Prior Publication Data

US 2024/0100929 A1 Mar. 28, 2024

(30) Foreign Application Priority Data

Sep. 28, 2022 (KR) .......................... 10-2022-0123526

(51) Int. Cl.
  *B60K 1/02* (2006.01)
  *B60K 17/04* (2006.01)
  *B60K 17/16* (2006.01)
  *F16D 23/06* (2006.01)

(52) U.S. Cl.
  CPC ................ *B60K 1/02* (2013.01); *B60K 17/16* (2013.01); *F16D 23/06* (2013.01); *F16D 2023/0631* (2013.01)

(58) Field of Classification Search
  CPC .......... B60K 1/02; B60K 17/16; B60K 17/046

USPC ........................................................ 74/661
  See application file for complete search history.

(56) References Cited

U.S. PATENT DOCUMENTS

| 7,201,690 | B2 * | 4/2007 | Miura ................... | B60W 10/08 475/5 |
| 8,475,311 | B2 * | 7/2013 | Ren ........................ | B60K 6/442 475/5 |
| 9,180,865 | B2 * | 11/2015 | Kitahata ................ | B60W 10/06 |
| 9,180,875 | B2 * | 11/2015 | Choi ...................... | B60W 20/40 |
| 9,933,049 | B2 * | 4/2018 | Kimes ..................... | B60L 50/61 |

(Continued)

FOREIGN PATENT DOCUMENTS

| JP | 2021-046155 | 3/2021 |
| KR | 10-2021-0055562 | 5/2021 |

OTHER PUBLICATIONS

Jinglai Wu et al. (2018). A robust energy management strategy for EVs with dual input power-split transmission. Mechanical Systems and Signal Processing. 111: 442-455.

*Primary Examiner* — Ha Dinh Ho
(74) *Attorney, Agent, or Firm* — Morgan, Lewis & Bockius LLP

(57) ABSTRACT

A powertrain apparatus for an electric vehicle, includes a planetary gear set including three rotation elements, a first motor connected to a first rotation element of the planetary gear set, a differential engaged to a second rotation element of the planetary gear set, a second motor connected to a third rotation element of the planetary gear set, and a synchronizer configured to selectively connect or disconnect between a driveshaft coupled to one side of the differential and the second motor and to selectively connect or disconnect between the second rotation element of the planetary gear set and the third rotation element of the planetary gear set.

17 Claims, 5 Drawing Sheets

(56) References Cited

U.S. PATENT DOCUMENTS

2010/0152940 A1* 6/2010 Mitsutani .............. B60W 10/08
                                                    180/65.23
2019/0178350 A1* 6/2019 Steinberger ............ B60K 6/442

* cited by examiner

POWERTRAIN FOR ELECTRIC VEHICLE

CROSS-REFERENCE TO RELATED APPLICATION

The present application claims priority to Korean Patent Application No. 10-2022-0123526, filed on Sep. 28, 2022, the entire contents of which is incorporated herein for all purposes by this reference.

BACKGROUND OF THE PRESENT DISCLOSURE

Field of the Present Disclosure

The present disclosure relates to the structure of a powertrain apparatus for an electric vehicle.

Description of Related Art

A powertrain for an electric vehicle may use a method of using two motors to provide driving wheels with power needed in driving the vehicle.

When an electric vehicle is capable of driving a motor at a more efficient operating point, the fuel efficiency of the vehicle may be improved.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a powertrain apparatus for an electric vehicle configured for changing the operating point of a motor to improve the fuel efficiency of the vehicle, configured for implementing torque vectoring, and facilitating high-performance traveling of the vehicle in which two motors used in the powertrain apparatus deliver maximum torque, greatly improving the marketability of the vehicle.

In accordance with an aspect of the present disclosure, the above and other objects may be accomplished by the provision of a powertrain apparatus for an electric vehicle, the powertrain apparatus including a planetary gear set including three rotation elements, a first motor connected to a first rotation element of the planetary gear set, a differential engaged to a second rotation element of the planetary gear set, a second motor connected to a third rotation element of the planetary gear set, and a synchronizer configured to selectively connect or disconnect between a driveshaft coupled to one side of the differential and the second motor and to selectively connect or disconnect between the second rotation element of the planetary gear set and the third rotation element of the planetary gear set.

The first motor may be directly connected to the first rotation element of the planetary gear set, the second motor may be directly connected to the third rotation element of the planetary gear set, and the differential may have a structure in which a differential ring gear provided in a differential case is gear-engaged with and connected to an output gear directly connected to the second rotation element of the planetary gear set.

The output gear may be rotatably mounted on an input shaft connecting the second motor with the third rotation element of the planetary gear set, and the synchronizer may be provided on the input shaft.

The input shaft may be provided with a regulating driving gear gear-engaged with a regulating driven gear provided on the driveshaft at the one side of the differential, the synchronizer may be provided with a hub on the input shaft, and a sleeve slidable in an axial direction on the hub may be gear-engaged with a clutch gear of the regulating driving gear.

The input shaft may have a first connection gear rotatably mounted thereon, the first connection gear may have a second connection gear gear-engaged therewith, the second connection gear may have a third connection gear concentrically disposed therewith and gear-engaged with the output gear, and the sleeve of the synchronizer may be gear-engaged with a clutch gear provided in the first connection gear.

The output gear may be integrated with the clutch gear gear-engaged with the sleeve of the synchronizer, and the sleeve of the synchronizer may slide to opposite sides in the axial direction on the hub to be in a state of being gear-engaged with the clutch gear of the regulating driving gear, to be in a state of being gear-engaged with the clutch gear of the output gear, or to be in a neutral state of being gear-engaged with neither of the two clutch gears.

In the planetary gear set, the first rotation element may be a ring gear, the second rotation element may be a planet carrier, and the third rotation element may be a sun gear.

In accordance with another aspect of the present disclosure, there is provided a powertrain apparatus for an electric vehicle, the powertrain apparatus including a planetary gear set including three rotation elements, wherein one of the rotation elements may be connected to a first motor, another one of the rotation elements may be connected to a second motor, and a remaining one of the rotation elements may be connected to a differential, a first clutch mechanism configured to selectively connect the second motor to a driveshaft at one side of the differential, and a second clutch mechanism configured to selectively connect two of the three rotation elements of the planetary gear set to each other.

The planetary gear set may have a ring gear to which the first motor is directly connected, may have a sun gear to which the second motor is connected by an input shaft, and may have a planet carrier to which an output gear gear-engaged with a differential ring gear provided in a differential case of the differential, is directly connected.

The output gear may be rotatably provided on the input shaft, the driveshaft at the one side of the differential may have a regulating driven gear integrated therewith, the regulating driven gear may have a regulating driving gear, rotatably provided on the input shaft and gear-engaged with the regulating driven gear, and the first clutch mechanism and the second clutch mechanism may form a synchronizer configured to selectively connect the input shaft to the output gear or to the regulating driving gear.

The synchronizer may include a hub provided on the input shaft, and a sleeve configured to selectively move in an axial direction on the hub to be gear-engaged with a clutch gear provided in the regulating driving gear or to be gear-engaged with a clutch gear provided in the output gear.

The input shaft may have a first connection gear rotatably mounted thereon, a second connection gear gear-engaged with the first connection gear and a third connection gear gear-engaged with the output gear may be concentrically connected to each other, and the synchronizer may include a hub provided on the input shaft, and a sleeve configured to selectively move in an axial direction on the hub to be gear-engaged with a clutch gear provided in the regulating driving gear or to be gear-engaged with a clutch gear provided in the first connection gear.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
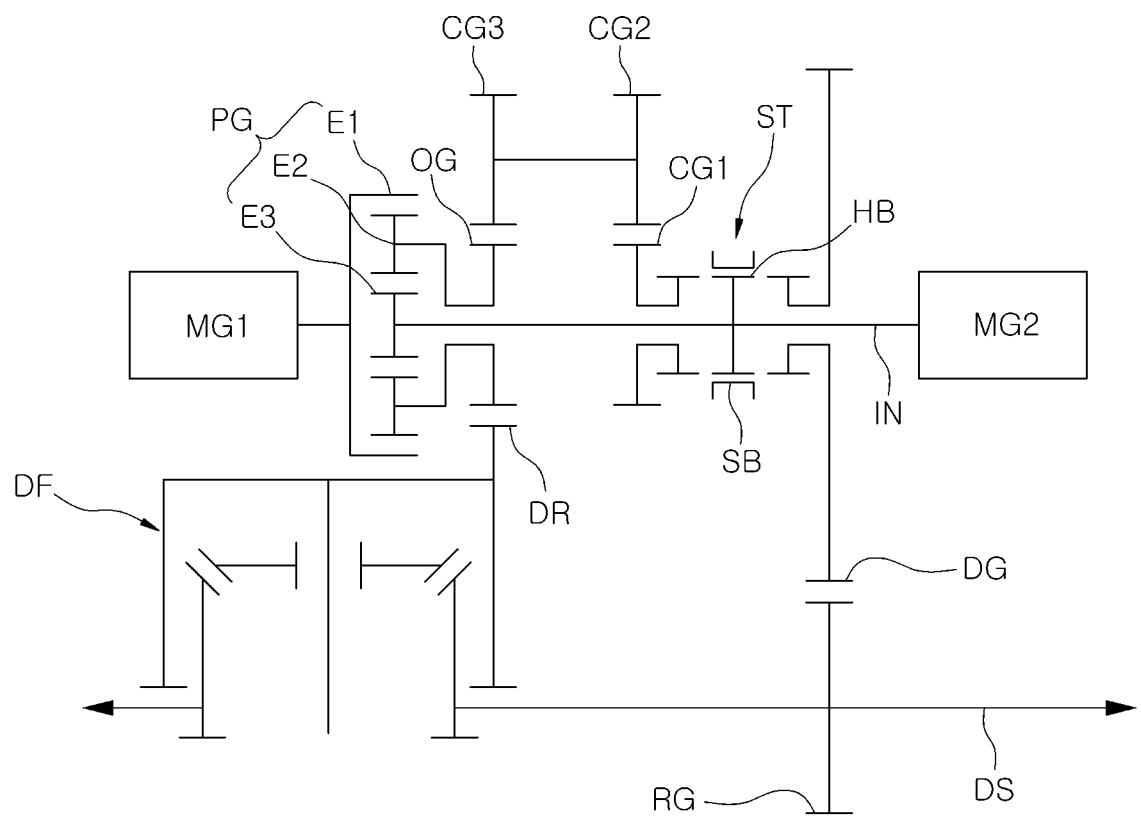
FIG. 1 is a view exemplarily illustrating an exemplary embodiment of a powertrain apparatus for an electric vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in detail with reference to the accompanying drawings, the same reference numerals are used to designate the same/like components, and a redundant description thereof will be omitted.

In general, a suffix such as "module" and "unit" may be used to refer to elements or components. Use of such a suffix herein is merely intended to facilitate description of the specification, and the suffix itself is not intended to have any special meaning or function.

In describing the present disclosure, if a detailed explanation of a related known function or construction is considered to unnecessarily obscure the gist of the present disclosure, such explanation includes been omitted but would be understood by those skilled in the art. The accompanying drawings are used only to help easily understand the technical idea of the present disclosure, and it should be understood that the idea of the present disclosure is not limited by the accompanying drawings. The idea of the present disclosure should be construed to encompass any alterations, equivalents and substitutes beyond what is shown in the accompanying drawings.

It will be understood that, although the terms first, second, etc. may be used herein to describe various elements, these elements should not be limited by these terms. These terms are generally only used to distinguish one element from another.

It will be understood that, when an element is referred to as being "connected to" another element, the element may be directly connected to the other element or intervening elements may also be present. In contrast, when an element is referred to as being "directly connected to" another element, there are no intervening elements present.

A singular representation may include a plural representation unless it represents a definitely different meaning from the context.

Terms such as "include" or "has" used herein should be understood that they are intended to indicate the existence of several elements, functions or steps, disclosed in the specification, and it is also understood that greater or fewer elements, functions, or steps may likewise be utilized.

Furthermore, "unit" or "control unit" included in the name of a motor control unit (MCU), a hybrid control unit (HCU), etc. is merely a term widely used in naming a controller that is configured to control a specific function of a vehicle, and does not mean a generic functional unit.

A controller may include a communication device configured to communicate with another controller or sensor to control the function it is responsible for, a memory configured to store an operating system or logic commands, input and output information, etc., and one or more processors configured to perform judgment, calculation, decision, etc. needed in controlling the function it is responsible for.

Referring to FIG. 1, an exemplary embodiment of a powertrain apparatus for an electric vehicle of the present disclosure includes a planetary gear set PG including three rotation elements, a first motor MG1 connected to a first rotation element E1 of the planetary gear set PG, a differential DF connected to a second rotation element E2 of the planetary gear set PG, a second motor MG2 connected to a third rotation element E3 of the planetary gear set PG, and a synchronizer ST configured to selectively connect or disconnect between a driveshaft coupled to one side of the differential DF and the second motor MG2 and to selectively connect or disconnect between the second rotation element E2 of the planetary gear set PG and the third rotation element E3 of the planetary gear set PG.

In other words, in an exemplary embodiment of the present disclosure, the differential DF is operated with the power of the first motor MG1 and the second motor MG2 to operate a driving wheel of the vehicle, connected to the differential DF by the driveshaft, to thereby drive the vehicle. Here, various travel modes may be implemented in accordance with the state of the synchronizer ST.

In the exemplary embodiment of the present disclosure, the first motor MG1 is directly connected to the first rotation element E1 of the planetary gear set PG, the second motor MG2 is directly connected to the third rotation element E3 of the planetary gear set PG, and the differential DF includes a structure in which a differential ring gear DR provided in a differential case is gear-engaged with and connected to an output gear OG directly connected to the second rotation element E2 of the planetary gear set PG.

Accordingly, the power of the first motor MG1 is appropriately combined with the power of the second motor MG2 by the planetary gear set PG to operate the differential DF through the output gear OG.

In the exemplary embodiment of the present disclosure, the output gear OG is rotatably mounted on an input shaft IN interconnecting the second motor MG2 with the third rotation element E3 of the planetary gear set PG, and the synchronizer ST is provided on the input shaft IN.

The input shaft IN is provided with a regulating driving gear DG gear-engaged with a regulating driven gear RG provided on the driveshaft at the one side of the differential DF, the synchronizer ST is provided with a hub HB at the input shaft IN, and the hub HB is provided with a sleeve SB, axially slidable in the hub HB and gear-engaged with a clutch gear provided in the regulating driving gear DG.

Therefore, when the sleeve SB is gear-engaged with the clutch gear of the regulating driving gear DG, the second motor MG2 may directly transmit power to the driveshaft through the regulating driving gear DG and the regulating driven gear RG.

For reference, hereinafter, the driveshaft at the one side of the differential DF, provided with the regulating driven gear RG, will be referred to as a selected driveshaft DS to distinguish a same from a driveshaft at another side of the differential DF.

In the exemplary embodiment of the present disclosure, the input shaft IN includes a first connection gear CG1 rotatably mounted thereon, the first connection gear CG1 includes a second connection gear CG2 gear-engaged therewith, the second connection gear CG2 includes a third connection gear CG3 concentrically disposed therewith and gear-engaged with the output gear OG, and the sleeve SB of the synchronizer ST is gear-engaged with a clutch gear provided in the first connection gear CG1.

Accordingly, when the sleeve SB of the synchronizer ST is gear-engaged with the clutch gear provided in the first connection gear CG1, the third rotation element E3 of the planetary gear set PG connected to the input shaft IN is connected to the second rotation element E2, and thus all the rotation elements of the planetary gear set PG are locked to one another and rotate at a same speed.

In the exemplary embodiment of the present disclosure, the first rotation element E1 of the planetary gear set PG is a ring gear, the second rotation element E2 is a planet carrier, and the third rotation element E3 is a sun gear.

Accordingly, when the sleeve SB of the synchronizer ST is gear-engaged with the clutch gear of the first connection gear CG1, the sun gear and the planet carrier are connected to each other.

Figure 2:
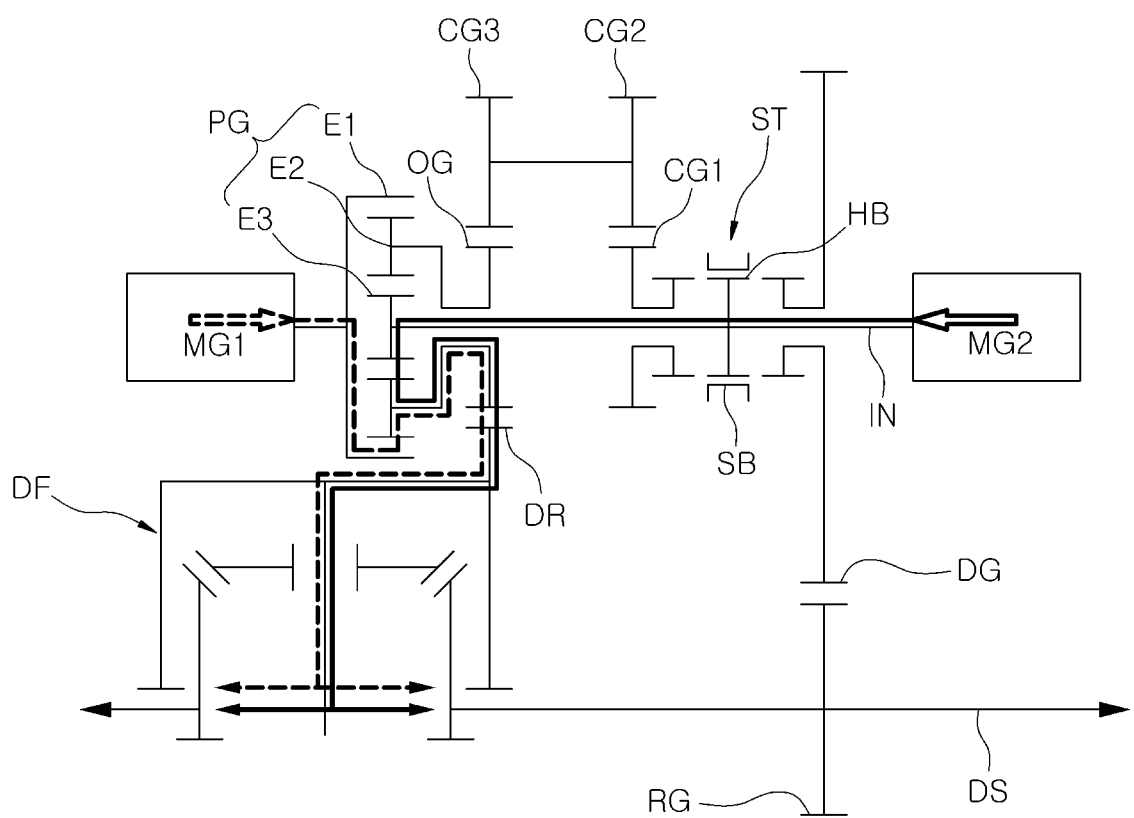
FIG. 2 is a view exemplarily illustrating that the powertrain apparatus of FIG. 1 implements a first mode to improve fuel efficiency.

When the sleeve SB of the synchronizer ST is in a neutral state neither gear-engaging with the clutch gear of the first connection gear CG1 nor gear-engaging with the clutch gear of the regulating driving gear DG, a first mode as illustrated in FIG. 2 may be implemented. Here, the power of the first motor MG1 and the power of the second motor MG2 are combined with each other in the planetary gear set PG and output to the differential DF through the planet carrier and the output gear OG.

Here, because the power of the first motor MG1 input to the ring gear and the power of the second motor MG2 input to the sun gear are combined according to the gear ratio of the planetary gear set PG and output to the planet carrier, the power may vary the speed of the first motor MG1 and the speed of the second motor MG2 while maintaining the speed of the planet carrier constant.

Accordingly, the first motor MG1 and the second motor MG2 may be operated at a more efficient operating point, respectively, and thus the fuel efficiency of the vehicle may be improved.

Figure 3:
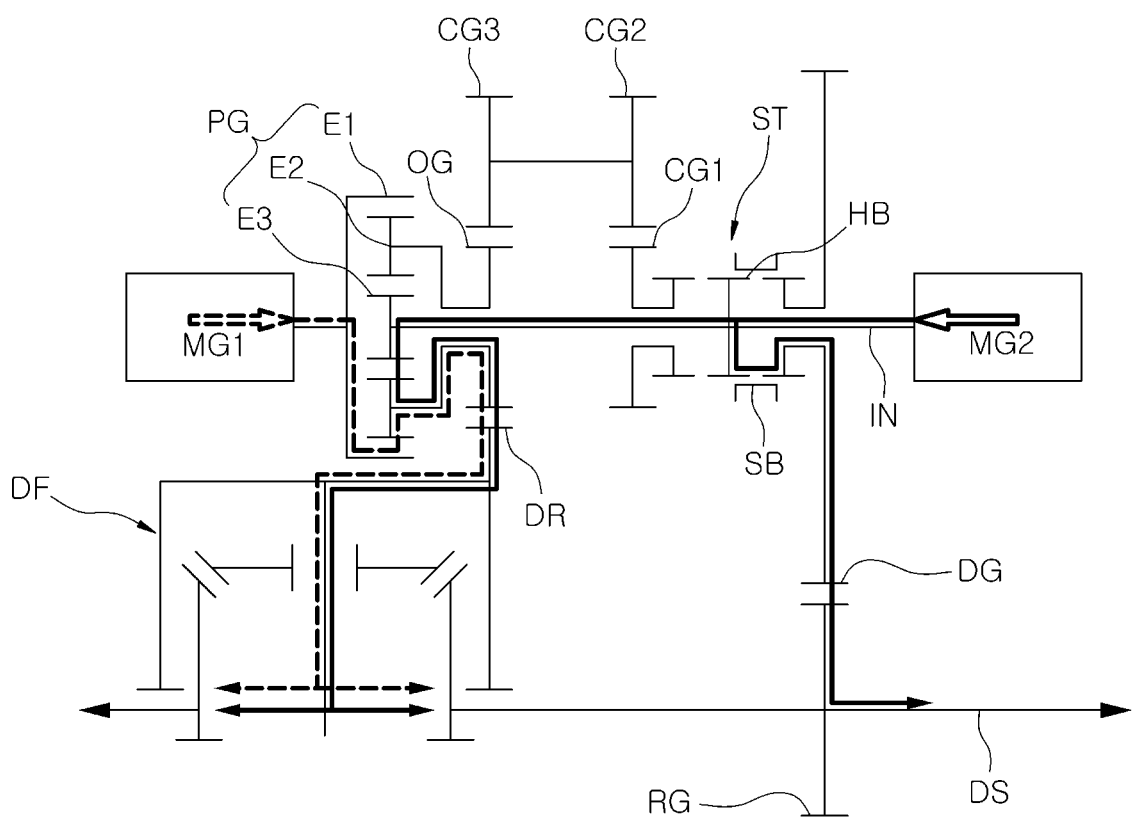
FIG. 3 is a view exemplarily illustrating that the powertrain apparatus of FIG. 1 implements a second mode to implement torque vectoring.

Meanwhile, in a second mode in which the sleeve SB of the synchronizer ST is gear-engaged with the clutch gear provided in the regulating driving gear DG as illustrated in FIG. 3, the second motor MG2 is connected to the selected driveshaft DS of the differential DF through the regulating driving gear DG and the regulating driven gear RG.

Accordingly, the power of the first motor MG1 and the power of the second motor MG2 are transmitted to the differential DF through the planet carrier and the output gear OG, and the powers are provided to driveshafts at opposite sides of the differential DF, allowing the torque of the second motor MG2 to be directly transmitted to the selected driveshaft DS through the regulating driving gear DG and the regulating driven gear RG. Accordingly, the torque of the second motor MG2 may be increased or decreased to continuously change the magnitude of the torque transmitted to the driveshafts at the opposite sides, implementing torque vectoring of the vehicle.

Figure 4:
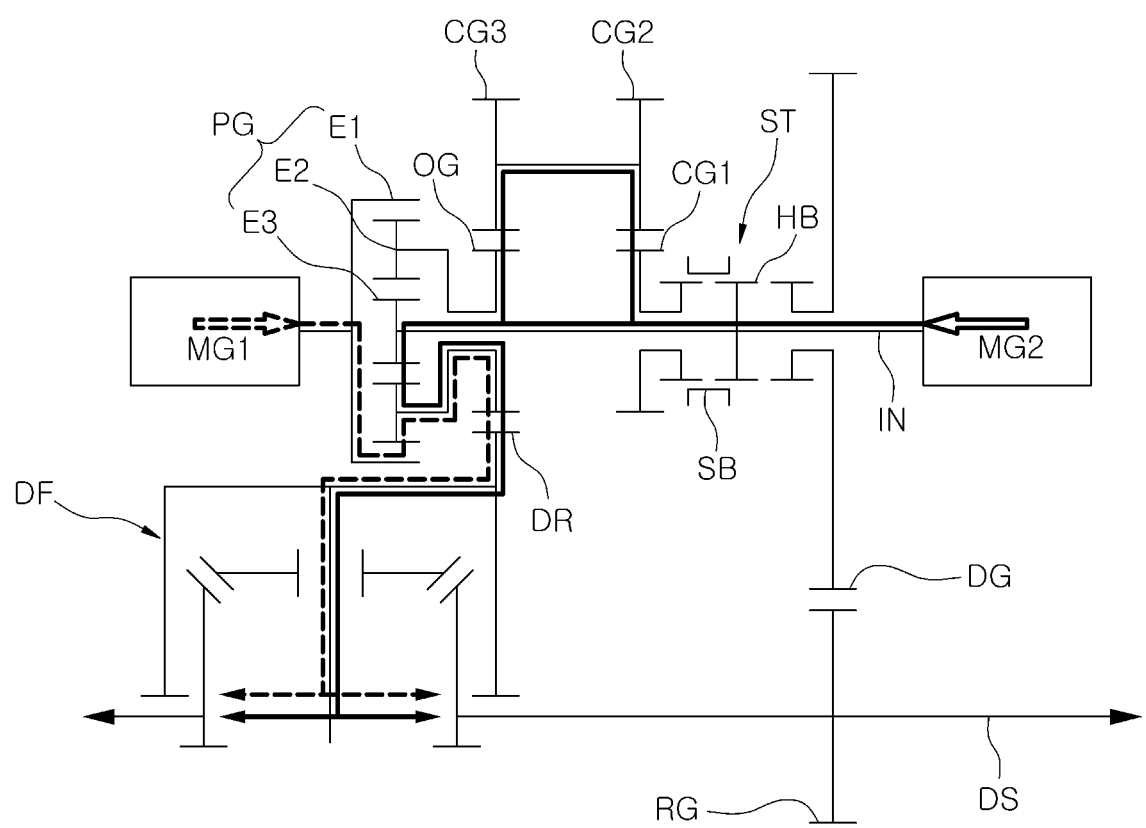
FIG. 4 is a view exemplarily illustrating that the powertrain apparatus of FIG. 1 implements a third mode to achieve high-performance traveling by operating two motors with maximum torque.

FIG. 4 illustrates a third mode in which the synchronizer ST is gear-engaged with the clutch gear of the first connection gear CG1. In the third mode, the sun gear is directly connected to the planet carrier in the planetary gear set PG, and thus all the rotation elements forming the planetary gear set PG are locked to one another and rotate integrally. Accordingly, when the first motor MG1 and the second motor MG2 are driven with a maximum torque, all the torques output from the first motor MG1 and the second motor MG2 are transmitted to the driving wheels through the differential DF, and thus the vehicle may perform high-performance traveling with predetermined driving force.

For reference, the synchronizer ST mentioned in an exemplary embodiment of the present disclosure may be a synchromesh-type device in which the sleeve SB is synchronized with the clutch gear through synchronization, and when synchronization is completed, the sleeve SB is gear-engaged with the clutch gear.

Figure 5:
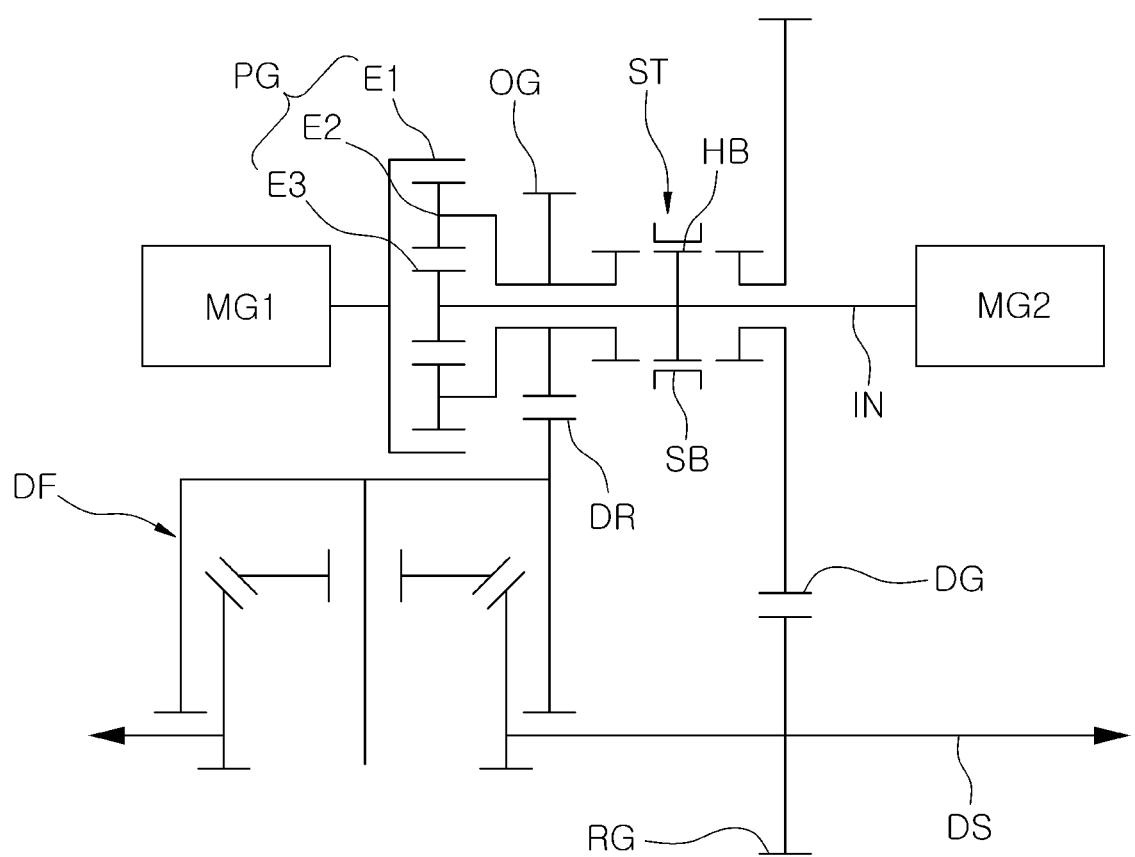
FIG. 5 is a view exemplarily illustrating a different embodiment of a powertrain apparatus configured an electric vehicle according to an exemplary embodiment of the present disclosure.

FIG. 5 is a view exemplarily illustrating a different embodiment of the powertrain apparatus for an electric vehicle according to an exemplary embodiment of the present disclosure. In the exemplary embodiment of the present disclosure, the first connection gear CG1 to the third connection gear CG3 are omitted, and the clutch gear is provided in the output gear OG. Except for those, all the other structures are a same as those of the exemplary embodiment of FIG. 1.

In other words, the output gear OG may be integrated with the clutch gear gear-engaged with the sleeve SB of the synchronizer ST, and the sleeve SB of the synchronizer ST may slide to opposite sides in the axial direction on the hub HB to be in a state of being gear-engaged with the clutch gear of the regulating driving gear DG, to be in a state of being gear-engaged with the clutch gear of the output gear OG, or to be in a neutral state of being gear-engaged with neither of the two clutch gears.

The exemplary embodiment of the present disclosure may realize a more compact powertrain apparatus compared to the exemplary embodiment of FIG. 1 and may reduce the weight of the powertrain apparatus.

The present disclosure as described above may be referred to as follows.

An exemplary embodiment of the powertrain apparatus for an electric vehicle of the present disclosure may include a planetary gear set PG including three rotation elements, wherein one of the rotation elements may be connected to a first motor MG1, another one of the rotation elements may be connected to a second motor MG2, and a remaining one of the rotation elements may be connected to a differential DF, a first clutch mechanism configured to selectively connect the second motor MG2 to a driveshaft at one side of the differential DF, and a second clutch mechanism configured to selectively connect two of the three rotation elements of the planetary gear set PG to each other.

The planetary gear set PG may have a ring gear to which the first motor MG1 is directly connected, may have a sun gear to which the second motor MG2 is connected by an input shaft IN, and may have a planet carrier to which an output gear OG, gear-engaged with a differential ring gear DR provided in a differential case of the differential DF, is directly connected.

The output gear OG may be rotatably provided on the input shaft IN, the driveshaft at the one side of the differential DF may have a regulating driven gear RG integrated therewith, the regulating driven gear RG may have a regulating driving gear DG, rotatably provided on the input shaft IN and gear-engaged with the regulating driven gear RG, and the first clutch mechanism and the second clutch mechanism may form a synchronizer ST configured to connect the input shaft IN to the output gear OG or to the regulating driving gear DG.

The synchronizer ST, as illustrated in FIG. 5, may include a hub HB provided on the input shaft IN, and a sleeve SB configured to move in an axial direction on the hub HB to be gear-engaged with a clutch gear provided in the regulating driving gear DG or to be gear-engaged with a clutch gear provided in the output gear OG.

Meanwhile, as illustrated in FIG. 1, the input shaft IN may have a first connection gear CG1 rotatably mounted thereon, a second connection gear CG2 gear-engaged with the first connection gear CG1 and a third connection gear CG3 gear-engaged with the output gear OG may be concentrically connected to each other, and the synchronizer ST may include a hub HB provided on the input shaft IN, and a sleeve SB configured to move in an axial direction on the hub HB to be gear-engaged with a clutch gear provided in the regulating driving gear DG or to be gear-engaged with a clutch gear provided in the first connection gear CG1.

As is apparent from the above description, various aspects of the present disclosure are directed to providing a powertrain apparatus for an electric vehicle configured for changing the operating point of a motor to improve the fuel efficiency of the vehicle, configured for implementing torque vectoring, and facilitating high-performance traveling of the vehicle in which two motors used in the powertrain deliver maximum torque, greatly improving the marketability of the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A powertrain apparatus for a vehicle, the powertrain apparatus comprising:
   a planetary gear set including a first rotation element, a second rotation element, and a third rotation element;
   a first motor connected to the first rotation element of the planetary gear set;
   a differential engaged to the second rotation element of the planetary gear set;
   a second motor connected to the third rotation element of the planetary gear set; and
   a synchronizer configured to selectively connect or disconnect between a driveshaft coupled to one side of the differential and the second motor and to selectively connect or disconnect between the second rotation element of the planetary gear set and the third rotation element of the planetary gear set.

2. The powertrain apparatus of claim 1,
   wherein the first motor is directly connected to the first rotation element of the planetary gear set, and
   wherein the second motor is directly connected to the third rotation element of the planetary gear set.

3. The powertrain apparatus of claim 1, further including:
   an output gear directly connected to the second rotation element of the planetary gear set, wherein the differential includes a differential ring gear provided in a differential case and gear-engaged with the output gear directly connected to the second rotation element of the planetary gear set.

4. The powertrain apparatus of claim 3,
   wherein the output gear is rotatably mounted on an input shaft connecting the second motor with the third rotation element of the planetary gear set, and
   wherein the synchronizer is provided on the input shaft.

5. The powertrain apparatus of claim 4,
   wherein the input shaft is provided with a regulating driving gear gear-engaged with a regulating driven gear provided on the driveshaft at the one side of the differential,
   wherein the synchronizer is provided with a hub on the input shaft, and
   wherein a sleeve of the synchronizer is slidable in an axial direction on the hub and is selectively gear-engaged with the regulating driving gear.

6. The powertrain apparatus of claim 5, wherein the regulating driving gear is rotatably mounted on the input shaft.

7. The powertrain apparatus of claim 5,
wherein the input shaft includes a first connection gear rotatably mounted on the input shaft,
wherein the first connection gear is gear engaged with a second connection gear,
wherein the second connection gear is connected to a third connection gear concentrically disposed with the second connection gear and is gear-engaged with the output gear, and
wherein the sleeve of the synchronizer is selectively gear-engaged with the first connection gear.

8. The powertrain apparatus of claim 5,
wherein the output gear is selectively gear-engaged directly with the sleeve of the synchronizer, and
wherein the sleeve of the synchronizer is configured to selectively slide to opposite sides in the axial direction on the hub so that the sleeve of the synchronizer is gear-engaged with the regulating driving gear, gear-engaged with the output gear, or is in a neutral state of being gear-engaged with neither of the regulating driving gear and the output gear.

9. The powertrain apparatus of claim 2, wherein, in the planetary gear set, the first rotation element is a ring gear, the second rotation element is a planet carrier, and the third rotation element is a sun gear.

10. A powertrain apparatus for a vehicle, the powertrain apparatus comprising:
a planetary gear set including first, second and third rotation elements, wherein the first rotation element is connected to a first motor, the second rotation element is connected to a second motor, and the third rotation element is connected to a differential;
a first clutch mechanism configured to selectively engage the second motor to a driveshaft at one side of the differential; and
a second clutch mechanism configured to selectively engage two of the first, second and third rotation elements of the planetary gear set to each other.

11. The powertrain apparatus of claim 10,
wherein the two of the first, second and third rotation elements of the planetary gear set is the second rotation element and the third rotation element.

12. The powertrain apparatus of claim 10,
wherein the first motor is directly connected to the first rotation element of the planetary gear set, and
wherein the second motor is directly connected to the third rotation element of the planetary gear set.

13. The powertrain apparatus of claim 10,
wherein the first rotation element is a ring gear to which the first motor is directly connected,
wherein the second rotation element is a sun gear to which the second motor is connected by an input shaft, and
wherein the third rotation element is a planet carrier to which an output gear gear-engaged with a differential ring gear provided in a differential case of the differential, is directly connected.

14. The powertrain apparatus of claim 13,
wherein the output gear is rotatably provided on the input shaft,
wherein the driveshaft at the one side of the differential includes a regulating driven gear integrated therewith,
wherein the regulating driven gear is gear-engaged to a regulating driving gear, rotatably provided on the input shaft, and
wherein the first clutch mechanism and the second clutch mechanism forms a synchronizer configured to selectively connect the input shaft to the output gear or to the regulating driving gear.

15. The powertrain apparatus of claim 14, wherein the synchronizer includes:
a hub provided on the input shaft; and
a sleeve configured to selectively move in an axial direction on the hub to be gear-engaged with the regulating driving gear or the output gear.

16. The powertrain apparatus of claim 14,
wherein the input shaft includes a first connection gear rotatably mounted on the input shaft,
wherein a second connection gear gear-engaged with the first connection gear, and a third connection gear gear-engaged with the output gear are concentrically connected to each other.

17. The powertrain apparatus of claim 16, wherein the synchronizer includes:
a hub provided on the input shaft; and
a sleeve configured to selectively move in an axial direction on the hub to be gear-engaged with the regulating driving gear or to be gear-engaged with the first connection gear.

* * * * *